(12) United States Patent
Wilson et al.

(10) Patent No.: US 12,146,501 B2
(45) Date of Patent: Nov. 19, 2024

(54) STEP SEAL FOR REFRIGERANT COMPRESSORS

(71) Applicant: Danfoss A/S, Nordborg (DK)

(72) Inventors: James Wilson, Alpharetta, GA (US); Jin Yan, Tallahassee, FL (US); Lin Xiang Sun, Tallahassee, FL (US); Ruiguo Gao, Tallahassee, FL (US); Brenden Richman, Tallahassee, FL (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 18/197,782

(22) Filed: May 16, 2023

(65) Prior Publication Data

US 2023/0279865 A1    Sep. 7, 2023

Related U.S. Application Data

(63) Continuation of application No. 17/546,161, filed on Dec. 9, 2021, now Pat. No. 11,692,557.

(60) Provisional application No. 63/224,479, filed on Jul. 22, 2021, provisional application No. 63/133,471, filed on Jan. 4, 2021.

(51) Int. Cl.
| | |
|---|---|
| *F01D 11/02* | (2006.01) |
| *F04D 17/10* | (2006.01) |
| *F04D 29/16* | (2006.01) |
| *F01D 5/18* | (2006.01) |
| *F01D 5/28* | (2006.01) |
| *F04D 29/10* | (2006.01) |
| *F16J 15/447* | (2006.01) |

(52) U.S. Cl.
CPC ............ *F04D 29/162* (2013.01); *F04D 17/10* (2013.01); *F01D 5/186* (2013.01); *F01D 5/189* (2013.01); *F01D 5/28* (2013.01); *F01D 11/02* (2013.01); *F04D 29/102* (2013.01); *F05D 2240/55* (2013.01); *F16J 15/4472* (2013.01)

(58) Field of Classification Search
CPC ....... F04D 29/102; F01D 11/02; F16J 15/447; F16J 15/4472; F16J 15/44–453; F16J 15/4476; F16J 33/80; F05D 2240/55; F02C 7/28
See application file for complete search history.

(56) References Cited

U.S. PATENT DOCUMENTS

| | | | | |
|---|---|---|---|---|
| 4,152,092 A | * | 5/1979 | Swearingen | ............ F01D 11/02 277/423 |
| 4,523,896 A | * | 6/1985 | Lhenry | ............... F04D 29/058 417/244 |
| 5,297,928 A | * | 3/1994 | Imakiire | ............... F04D 29/162 415/174.3 |

(Continued)

*Primary Examiner* — Brian P Wolcott
*Assistant Examiner* — Behnoush Haghighian
(74) *Attorney, Agent, or Firm* — Carlson, Gaskey & Olds, P.C.

(57) ABSTRACT

In some aspects, the techniques described herein relate to a refrigerant compressor, including: a stator; a rotor configured to rotate with respect to the stator; and at least one step seal between the rotor and the stator, wherein the step seal includes a first tooth and a second tooth extending from the rotor toward the stator, wherein a downstream surface of the first tooth and an upstream surface of the second tooth are arranged at an angle relative to one another, wherein the angle is less than 90°.

18 Claims, 9 Drawing Sheets

(56) References Cited

U.S. PATENT DOCUMENTS

| | | | | |
|---|---|---|---|---|
| 5,639,095 | A * | 6/1997 | Rhode | F16J 15/4472 |
| | | | | 277/303 |
| 7,445,213 | B1 * | 11/2008 | Pelfrey | F01D 11/02 |
| | | | | 277/420 |
| 9,803,493 | B2 * | 10/2017 | Svihla | F01D 11/02 |
| 10,066,750 | B2 * | 9/2018 | Nakaniwa | F16J 15/4472 |
| 10,281,046 | B2 * | 5/2019 | Daussin | F16J 15/4472 |
| 10,408,077 | B2 * | 9/2019 | Port | F01D 11/10 |
| 10,570,768 | B2 * | 2/2020 | Morinaka | F01D 11/02 |
| 11,060,615 | B2 * | 7/2021 | Morinaka | F16J 15/44 |
| 2007/0065276 | A1 * | 3/2007 | Muller | F01D 11/02 |
| | | | | 415/170.1 |
| 2011/0250073 | A1 * | 10/2011 | Neeli | F01D 11/001 |
| | | | | 416/223 R |
| 2012/0091662 | A1 * | 4/2012 | Neeli | F01D 11/02 |
| | | | | 277/420 |
| 2015/0260294 | A1 * | 9/2015 | Nakaniwa | F04D 29/102 |
| | | | | 277/414 |
| 2016/0003510 | A1 * | 1/2016 | De Larminat | F25B 43/02 |
| | | | | 62/470 |
| 2016/0097302 | A1 * | 4/2016 | Svihla | F01D 11/02 |
| | | | | 417/407 |
| 2017/0241427 | A1 * | 8/2017 | Nakaniwa | F16J 15/444 |
| 2018/0156337 | A1 * | 6/2018 | Daussin | F16J 15/4472 |
| 2018/0187567 | A1 * | 7/2018 | Morinaka | F01D 11/02 |
| 2018/0209290 | A1 * | 7/2018 | Port | F04D 29/102 |
| 2019/0128273 | A1 * | 5/2019 | Goldenberg | F04D 29/083 |
| 2019/0136863 | A1 * | 5/2019 | Morinaka | F04D 29/10 |

* cited by examiner

STEP SEAL FOR REFRIGERANT COMPRESSORS

RELATED APPLICATIONS

This application is a continuation of prior U.S. application Ser. No. 17/546,161, filed Dec. 9, 2021, the entirety of which is herein incorporated by reference. The '161 application claims the benefit of U.S. Provisional Application No. 63/133,471, filed Jan. 4, 2021, and also claims the benefit of U.S. Provisional Application No. 63/224,479, filed Jul. 22, 2021. The entirety of the '471 and '479 applications are herein incorporated by reference.

BACKGROUND

Refrigerant compressors are used to circulate refrigerant in a chiller via a refrigerant loop. Refrigerant loops are known to include a condenser, an expansion device, and an evaporator. The compressor compresses the fluid, which then travels to a condenser, which in turn cools and condenses the fluid. The refrigerant then goes to an expansion device, which decreases the pressure of the fluid, and to the evaporator, where the fluid is vaporized, completing a refrigeration cycle.

Many refrigerant compressors are centrifugal compressors and have an electric motor that drives at least one impeller to compress refrigerant. The fluid is then directed downstream for use in the chiller system. Known refrigerant compressors have seals.

SUMMARY

In some aspects, the techniques described herein relate to a refrigerant compressor, including: a stator; a rotor configured to rotate with respect to the stator; and at least one step seal between the rotor and the stator, wherein the step seal includes a first tooth and a second tooth extending from the rotor toward the stator, wherein a downstream surface of the first tooth and an upstream surface of the second tooth are arranged at an angle relative to one another, wherein the angle is less than 90°.

In some aspects, the techniques described herein relate to a refrigerant compressor as recited claim 1, wherein the first tooth and the second tooth include a pair of teeth, and the step seal includes a plurality of pairs of teeth, and wherein each pair of teeth is provided in a stepped arrangement.

In some aspects, the techniques described herein relate to a refrigerant compressor, wherein the first and second teeth are formed in the rotor and an axial tooth is formed in the stator, and wherein the axial tooth extends in a substantially axial direction radially outward of the first and second teeth.

In some aspects, the techniques described herein relate to a refrigerant compressor, wherein the first tooth has a first point and the second tooth has a second point, and wherein the first and second points are arranged at a common radial position.

In some aspects, the techniques described herein relate to a refrigerant compressor, wherein the downstream surface and the upstream surface meet at a curved surface to form a curved cavity.

In some aspects, the techniques described herein relate to a refrigerant compressor, wherein a radially inner cavity wall is arranged downstream of the second tooth to form a second cavity downstream of the curved cavity.

In some aspects, the techniques described herein relate to a refrigerant compressor, wherein the second cavity is a curved cavity.

In some aspects, the techniques described herein relate to a refrigerant compressor, wherein the second cavity is a square cavity.

In some aspects, the techniques described herein relate to a refrigerant compressor, wherein the stator has an abradable portion, and wherein the first and second teeth extend toward the abradable portion.

In some aspects, the techniques described herein relate to a refrigerant compressor, wherein the first and second teeth are configured to contact the abradable portion and carve tracks into the abradable portion over time.

In some aspects, the techniques described herein relate to a refrigerant compressor, wherein the refrigerant compressor is used in a heating, ventilation, and air conditioning (HVAC) chiller system.

In some aspects, the techniques described herein relate to a refrigerant compressor, wherein a stator cavity is arranged in the stator, the stator cavity is arranged axially between the first tooth and the second tooth.

In some aspects, the techniques described herein relate to a refrigeration system, including: a condenser; an evaporator; an expansion device; and a compressor, wherein the compressor includes a stator, a rotor configured to rotate with respect to the stator, and at least one step seal between the rotor and the stator, wherein the step seal includes a first tooth and a second tooth extending from the rotor toward the stator, wherein a downstream surface of the first tooth and an upstream surface of the second tooth are arranged at an angle relative to one another, wherein the angle is less than 90°.

In some aspects, the techniques described herein relate to a refrigeration system as recited claim 13, wherein the first tooth and the second tooth include a pair of teeth, and the step seal includes a plurality of pairs of teeth, each pair of teeth provided in a stepped arrangement.

In some aspects, the techniques described herein relate to a refrigeration system, wherein the first tooth has a first point and the second tooth has a second point, and wherein the first and second points are arranged at a common radial position.

In some aspects, the techniques described herein relate to a refrigeration system, wherein the downstream surface and the upstream surface meet at a curved surface to form a curved cavity.

In some aspects, the techniques described herein relate to a refrigeration system, wherein a radially inner cavity wall is arranged downstream of the second tooth to form a second cavity downstream of the curved cavity.

In some aspects, the techniques described herein relate to a refrigeration system, wherein the second cavity is a curved cavity.

In some aspects, the techniques described herein relate to a refrigeration system, wherein the second cavity is a square cavity.

In some aspects, the techniques described herein relate to a refrigeration system, wherein the stator has an abradable portion, wherein the first and second teeth extend toward the abradable portion, and wherein the first and second teeth are configured to contact the abradable portion and carve tracks into the abradable portion over time.

DETAILED DESCRIPTION

Figure 1:
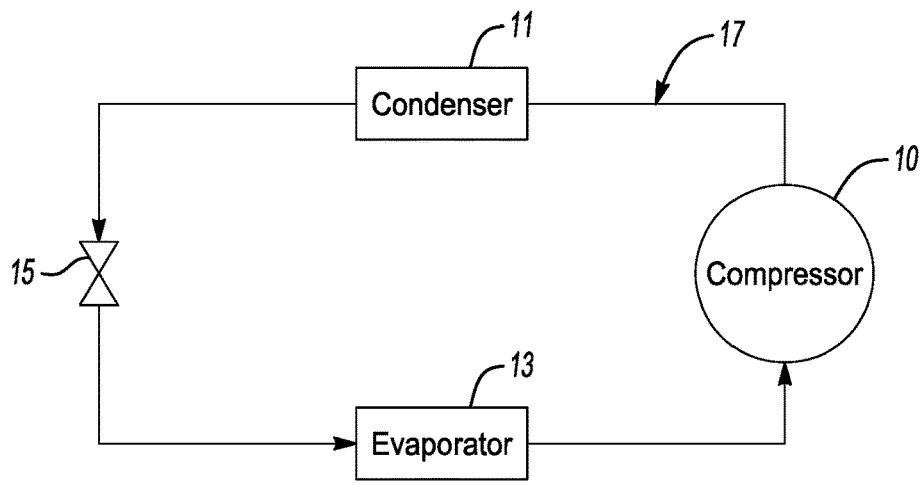
FIG. 1 is a schematic illustration of a refrigerant loop.

FIG. 1 illustrates a refrigerant system, which includes a compressor 10, a condenser 11, an evaporator 13, and an expansion device 15 arranged in a main refrigerant loop, or circuit, 17. This refrigerant system may be used in a chiller, for example. In that example, a cooling tower may be in fluid communication with the condenser 11. While a particular example of the refrigerant system is shown, this application extends to other refrigerant system configurations, including configurations that do not include a chiller. For instance, the main refrigerant loop 17 can include an economizer downstream of the condenser 11 and upstream of the expansion device 15. The refrigerant system may be part of a heating, ventilation, and air conditioning (HVAC) chiller system, for example.

Figure 2:
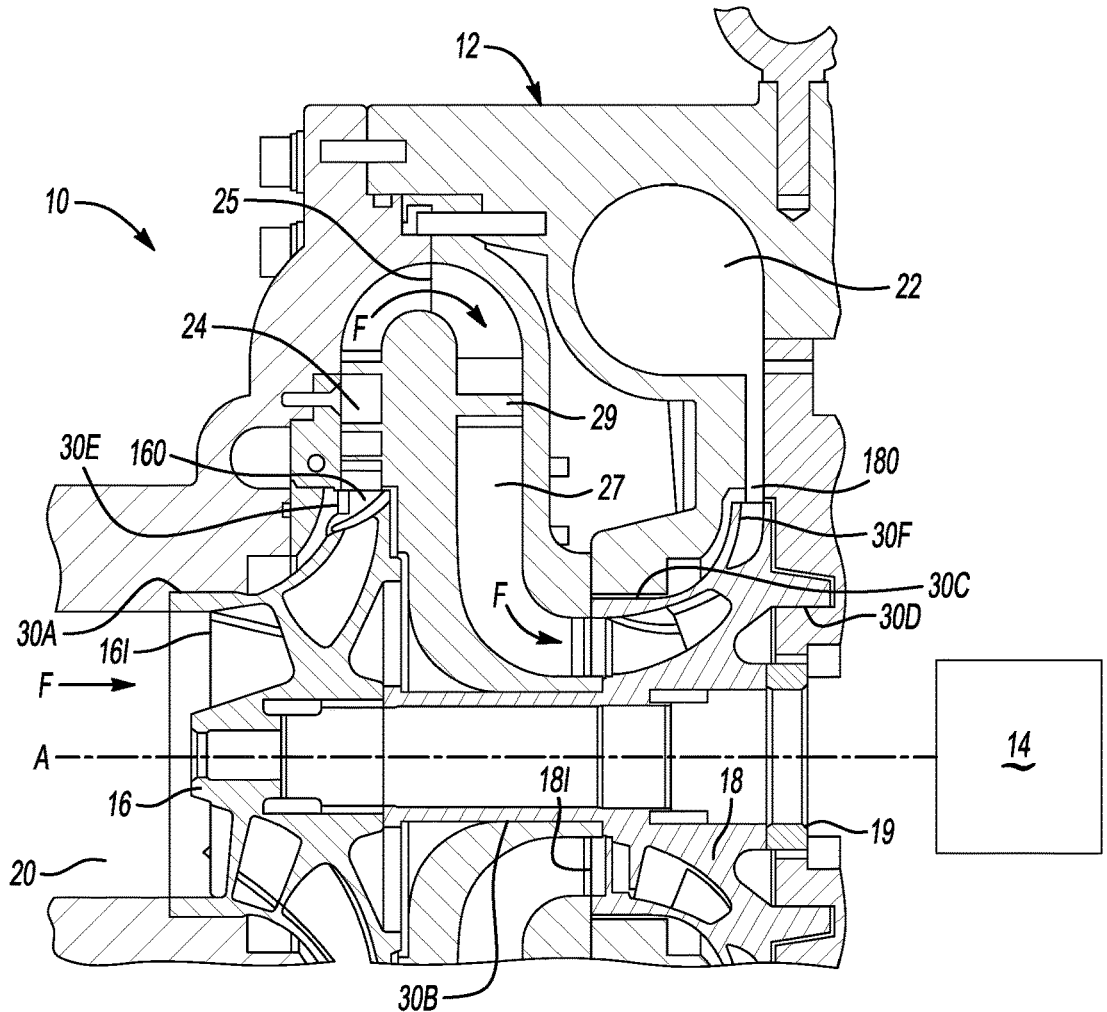
FIG. 2 shows a schematic view of a refrigerant compressor.

FIG. 2 illustrates a portion of the compressor 10 from FIG. 1 in more detail, which in this example is a refrigerant compressor 10 ("compressor 10"). The compressor 10 includes a housing 12, which encloses an electric motor 14. The housing 12 may comprise one or more pieces. The electric motor 14 rotationally drives at least one impeller about an axis A to compress refrigerant. Example refrigerants include chemical refrigerants, such as R-134a and the like. The motor 14 may be driven by a variable frequency drive. The compressor 10 includes a first impeller 16 and a second impeller 18, each of which is connected to the motor 14 via a shaft 19. In the illustrated example, the impellers 16, 18 are centrifugal impellers. While two impellers are illustrated, this disclosure extends to compressors having one or more impellers. In some embodiments, the compressor 10 may have two axial compression stages, or may have a mixed stage (i.e., a stage with a radial and an axial component) and an axial compression stage.

The housing 12 establishes a main refrigerant flow path F. In particular, the housing 12 establishes an outer boundary for the main refrigerant flow path F. A first, or main, flow of refrigerant is configured to flow along the main refrigerant flow path F between a compressor inlet 20 and a compressor outlet 22. In the illustrated example, there are no inlet guide vanes disposed at the compressor inlet 20. The lack of inlet guide vanes reduces the number of mechanical parts in the compressor 10. In other examples, inlet guide vanes may be arranged near the inlet 20.

From left to right in FIG. 2, the main refrigerant flow path F begins at the compressor inlet 20, where refrigerant is drawn toward the first impeller 16. The first impeller 16 is provided in the main refrigerant flow path F, and is arranged upstream of the second impeller 18 relative to the main refrigerant flow path F. The first impeller 16 includes an inlet 161 arranged axially, generally parallel to the axis A, and an outlet 160 arranged radially, generally perpendicular to the axis A.

Immediately downstream of the outlet 160, in this example, is a first vaned diffuser 24. The main refrigerant flow path F extends through the diffuser 24 in a direction generally radially away from the axis A. Next, the main refrigerant flow path F turns 180 degrees in a cross-over bend 25, and flows radially inward through a return channel 27 toward the second impeller 18. Like the first impeller 16, the second impeller 18 includes an axially oriented inlet 181 and a radially oriented outlet 180.

The compressor 10 has a plurality of seals 30A-30F. The seals 30A-30F prevent the main refrigerant from escaping the flow path F. The seal 30A is located between an outer diameter of the first impeller 16 and the housing 12, near the inlet 161. The seal 30B is located between the shaft 19 and the housing 12 between the first and second impellers 16, 18. The seal 30C is located between an outer diameter of the second impeller 18 and the housing 12, near the inlet 181. The seal 30D is located at an inner diameter of the second impeller 18 and the motor 14. At least one of the seals 30A-30D is a step seal. In one particular embodiment, all of seals 30A-30D are step seals.

Step seals are used in turbomachinery to restrict or prevent the flow of fluids, such as liquid or gas, between adjacent internal compartments with different pressures. A step seal prevents fluid flow from travelling from a higher pressure location to a lower pressure location. Step seals may generally include a plurality of fins or teeth that define a plurality of cavities. The cavities entrap working fluid between a moving component and a stationary component. The trapped fluid thus creates a barrier that isolates a high pressure region within the machine from a region of lower pressure. In one example, the stationary and moving components are a stator and a rotor, such as an impeller. In another example, the stationary component may be provided by an insert within the compressor housing.

Figure 3:
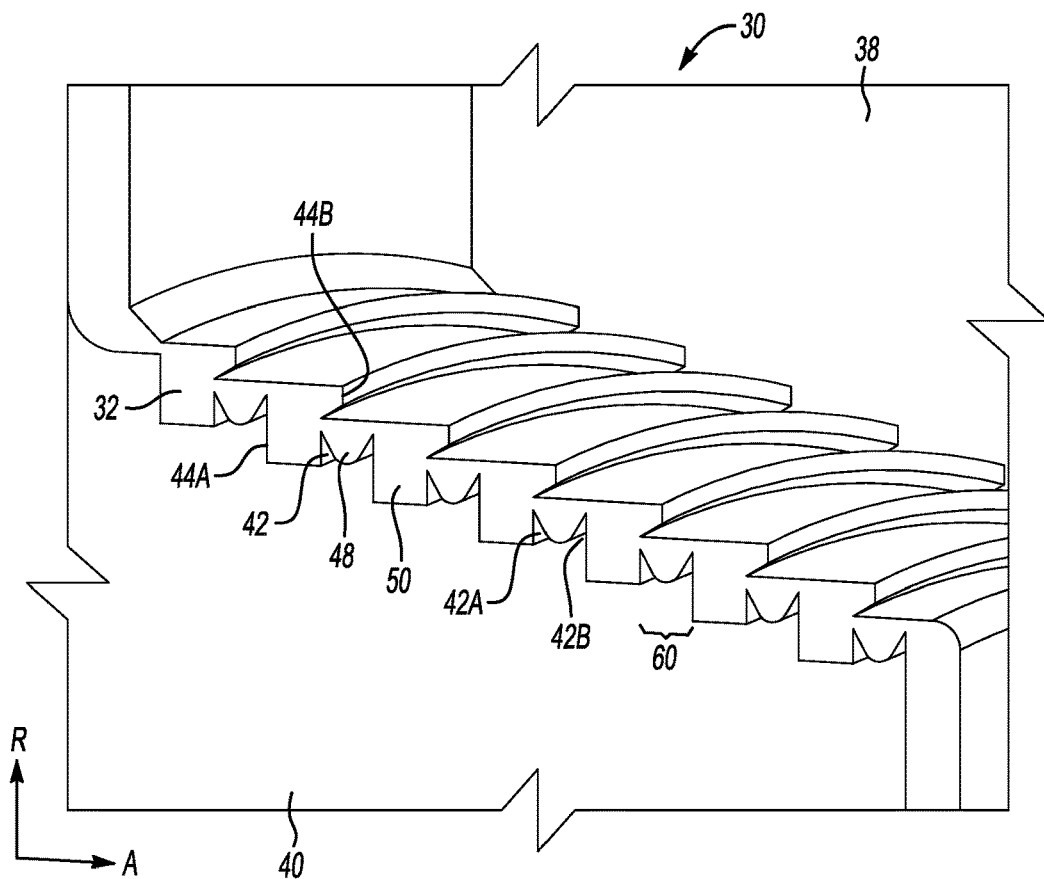
FIG. 3 shows a schematic view of an example step seal arrangement.

FIG. 3 schematically shows an example stepped seal 30, which is representative of any one of the seals 30A-30D. A seal flow path 32 is formed between a stator 38 and a rotor 40. In the illustrated embodiment, a plurality of teeth 42 extend generally radially outward (i.e., in a direction normal to axis A) from the rotor 40 in a direction towards the stator 38 to define a plurality of cavities 48, 50 along the flow path 32 between the teeth 42. In another embodiment, a plurality of teeth 42 extend outward from the stator 38.

The teeth 42 on the rotor 40 are arranged in a stepped arrangement, meaning some are arranged at a different radial position than others. In particular, in FIG. 3, the teeth 42 are spaced-apart radially by steps 44A. In the illustrated example, the steps 44A are formed such that the teeth are arranged in pairs 60. Each pair 60 has a first tooth 42A and a second tooth 42B. The teeth 42A, 42B in each pair 60 are at the same position in a radial direction relative to an axis of rotation of the rotor 40 (i.e., the axis A). The steps 44A and teeth 42 are cut out of the rotor 40 using known manufacturing techniques, in an example Similar steps 44B are also cut into the stator 38 to align with the rotor 40. The steps 44B may be formed from an insert within the housing, for example. The insert may be metallic. In the illustrated example, there are seven of each of the steps 44A, 44B. In other examples, there may be at least five of each of the steps 44A, 44B. In a further example, there may be ten or fewer of each step 44A, 44B. The teeth 42 and the steps 44A, 44B introduce reverse flow, which stalls refrigerant flow (such as trapping flow in the cavities 48, 50), and helps decrease total leakage.

Figure 4A:
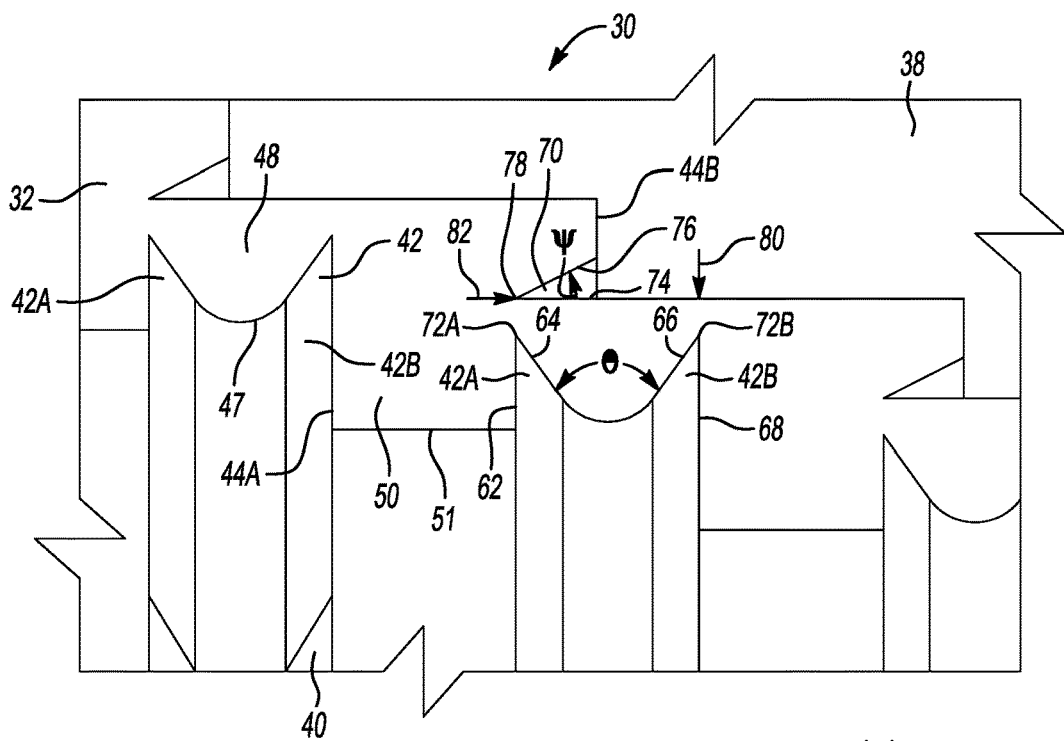
FIG. 4A shows an example step seal arrangement.

FIG. 4A illustrates further details of the step seal 30. The pairs 60 of teeth 42A, 42B form two differently shaped cavities 48, 50. The cavities 50 have a squared shape, while the cavities 48 have a rounded shape. The first tooth 42A has an upstream surface 62 and a downstream surface 64. The second tooth 42B has an upstream surface 66 and a downstream surface 68. In this example, the upstream surface 62 of the first tooth 42A and the downstream surface 68 of a second tooth 42B form the walls of each cavity 50. The cavity 50 has a radially inner cavity wall 51. The cavity wall 51 is substantially parallel to the axis A. The upstream surface 62 and downstream surface 68 each extend radially outward from the cavity wall 51 at approximately a right angle. In other words, the cavity 50 has a square-shaped bottom.

The downstream surface 64 of the tooth 42A and upstream surface 66 of the tooth 42B are angled at an angle with respect to the radial direction. The surfaces 64, 66 are joined at a curved inner wall 47 to form the cavity 48. The cavity 48 is a curved cavity, while the cavity 50 is a square cavity. The surfaces 64, 66 are arranged at an angle $\ominus$ with respect to one another. The angle $\ominus$ is less than 90°. In a further example, the angle $\ominus$ is between 45° and 90°.

The upstream surface 62 and downstream surface 64 of the first tooth 42A meet at a point 72A. The upstream surface 66 and the downstream surface 68 of the second tooth 42B meet at a point 72B. The points 72A, 72B are the radially outermost portion of the rotor 40 in each step. In this example, the points 72A, 72B within each pair 60 extend to a same position in the radial direction. A radial clearance 80 is defined between the points 72A, 72B and the stator 38. In an example, the radial clearance 80 is at least 0.15 mm. An axial clearance 82 is defined between the downstream surface 68 of the second tooth 42B and the upstream surface 62 of an adjacent pair of teeth 60. In an example, the axial clearance is at least 0.7 mm. An axially extending tooth 70 extends in a substantially axial direction from the stator 38. The axial tooth 70 extends into the flowpath from the step 44B. The axial tooth 70 may have an inner surface 74 and an outer surface 76. In one example, the inner surface 74 is substantially parallel to the axis of rotation A. The inner and outer surfaces 74, 76 are arranged at an angle $\psi$ with respect to one another. The angle $\psi$ is less than 60°, for example. The inner and outer surfaces 74, 76 extend in an upstream direction and meet at a point 78. In one example, the point 78 is aligned with the point 72A in the axial direction.

Figure 4B:
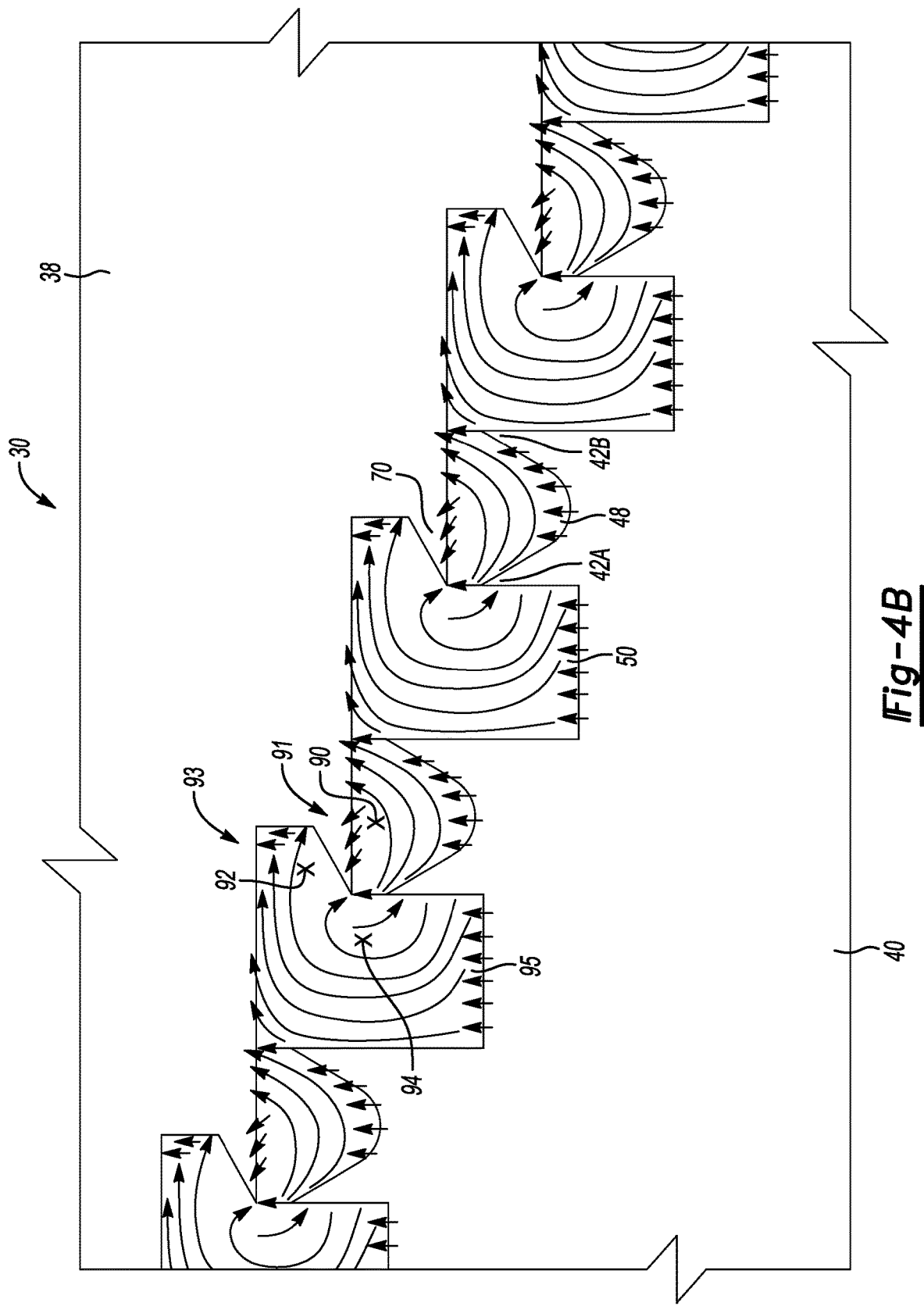
FIG. 4B shows the example step seal arrangement of FIG. 4A.

FIG. 4B illustrates the fluid flow through the step seal 30. As shown, the radial teeth 42 and axial teeth 70 create eddies in the fluid, trapping fluid in the cavities 48, 50. Although an example seal 30 is shown, the particular shape and size may be tailored to a particular compressor size, speed, and refrigerant. The cavities 48, 50 provide recirculation zones within the refrigerant leakage path to help decrease leakage. The three sharp teeth 42A, 42B, 70 create vortices 90, 92, 94 in the flow field. This tooth arrangement provides three recirculating regions 91, 93, 95 per step to help passively control the flow, decreasing total leakage and increasing efficiency.

Figure 5A:
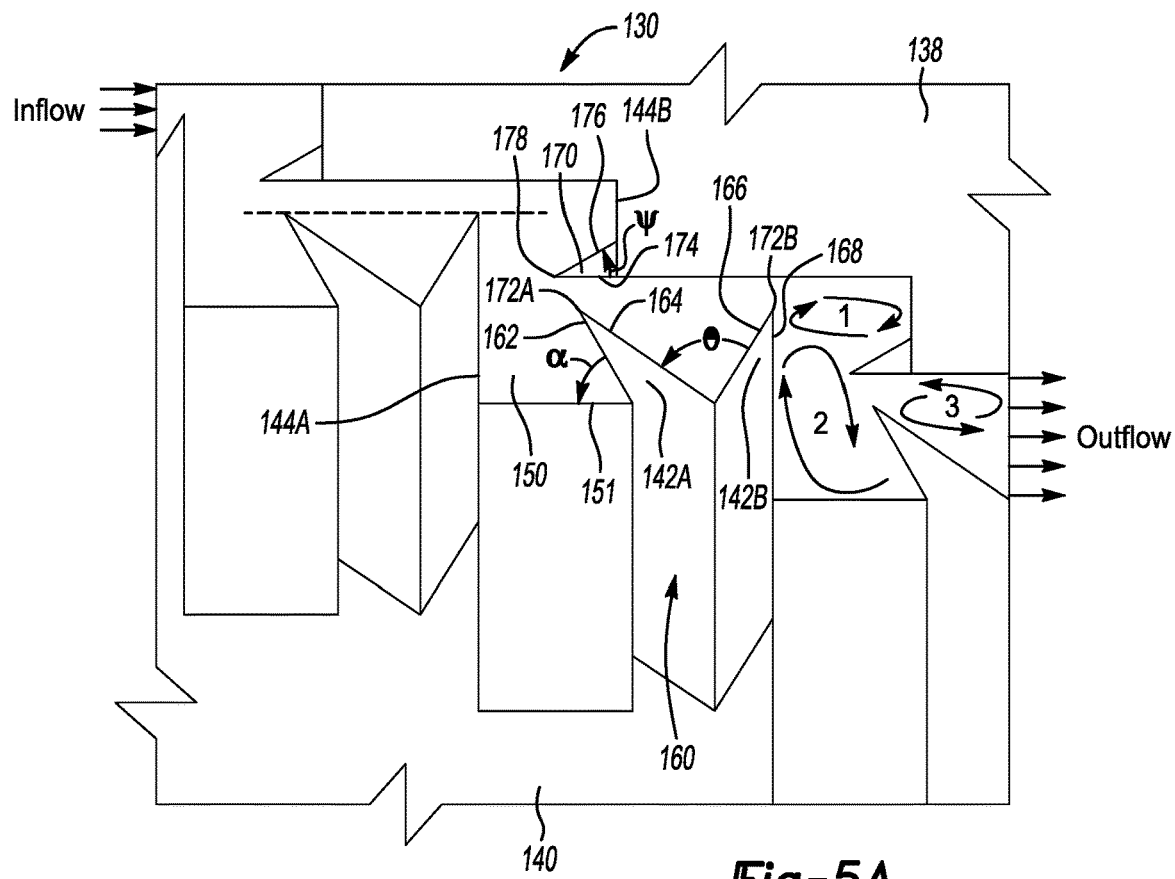
FIG. 5A shows another example step seal arrangement.

FIG. 5A illustrates another example step seal 130. To the extent not otherwise described or shown, the step seal 130 corresponds to the step seal 30 of FIGS. 3, 4A, and 4B, with like parts having reference numerals preappended with a "1." In this example, the two teeth 142A, 142B in each pair 160 form two angled cavities 148, 150. The upstream surface 162 of the first tooth 142A extends from the radially inner cavity wall 151 at an angle α that is less than 90°. The downstream surface 168 of the second tooth 142B extends from the cavity wall 151 at substantially a right angle, or perpendicular to the axis A. Thus, the cavity 150 formed between adjacent pairs of teeth 60 has an angled shape. The downstream surface 164 of the first tooth 142A and the upstream surface 166 of the second tooth 142B meet at a point defining an angle $\ominus$. The angle $\ominus$ may be less than 90°, for example.

The upstream surface 162 and downstream surface 164 of the first tooth 142A meet at a point 172A. The upstream surface 166 and the downstream surface 168 of the second tooth 142B meet at a point 172B. The points 172A, 172B within each pair 160 extend to a same position in the radial direction. In other words, the points 172A, 172B touch the locus of the radial clearance between the rotor 140 and the stator 138.

An axially extending tooth 170 extends in a substantially axial direction from the stator 138. The axial tooth 170 extends into the flowpath from the step 144B. The inner surface 74 of the axial tooth 170 is substantially parallel to the axis of rotation A. The inner and outer surfaces 174, 176 of the axial tooth 170 are arranged at an angle $\psi$ with respect to one another. The angle $\psi$ is less than 60°, for example. The inner and outer surfaces 174, 176 extend in an upstream direction and meet at a point 178. In one example, the point 178 extends upstream of the first tooth 142A. In another example, the point 178 is substantially aligned with the first tooth 142A in the axial direction.

Figure 5B:
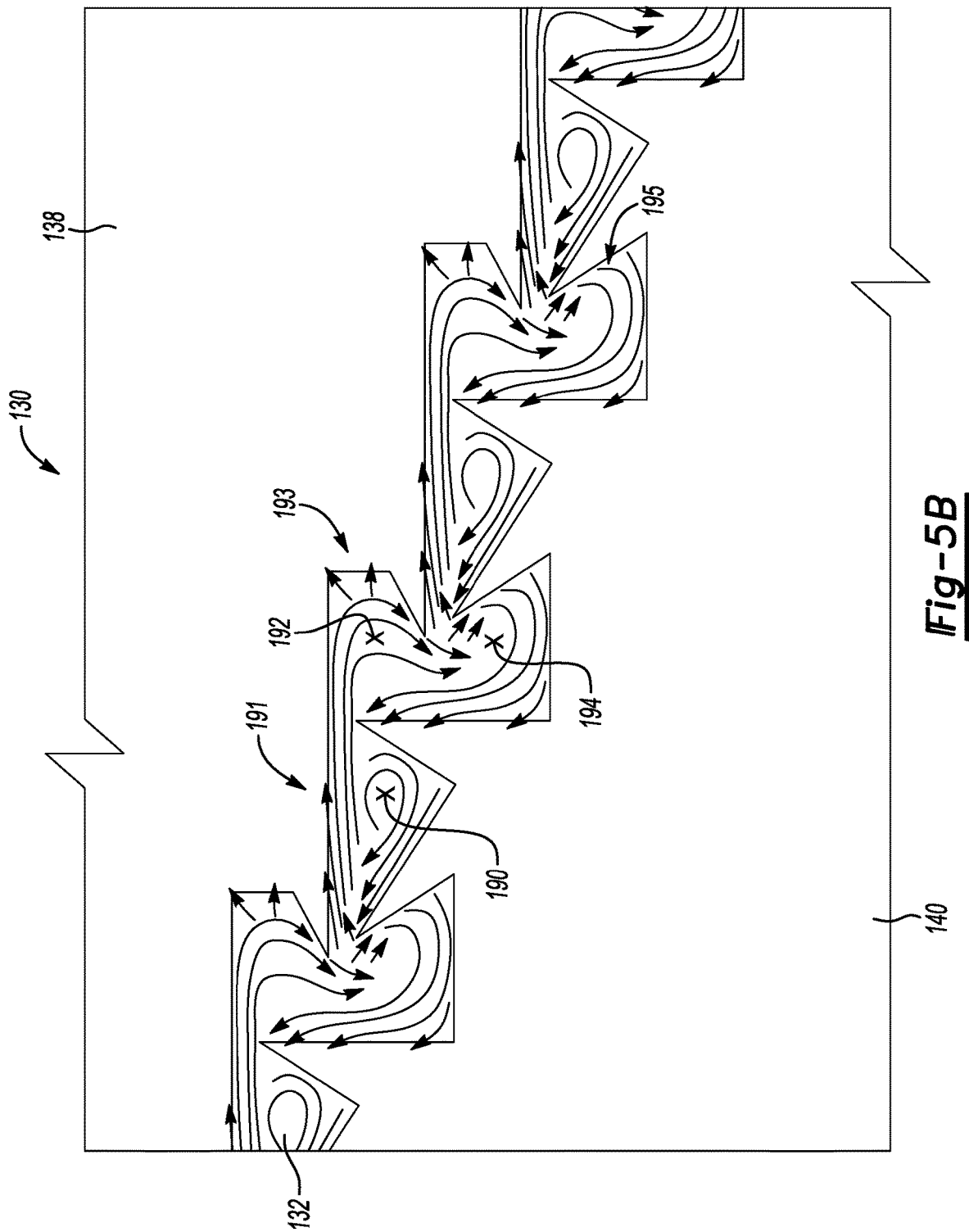
FIG. 5B shows the example step seal arrangement of FIG. 5A.

FIG. 5B illustrates the fluid flow through the step seal 130. This tooth arrangement provides three recirculation zones 191, 193, 195 per step. The three sharp teeth 142A, 142B, 170 create vortices 190, 192, 194 in the flow field. In some examples, this arrangement passively controls the flow to decrease total leakage, and may reduce leakage by 40-80% compared to known conventional seals.

Figure 6A:
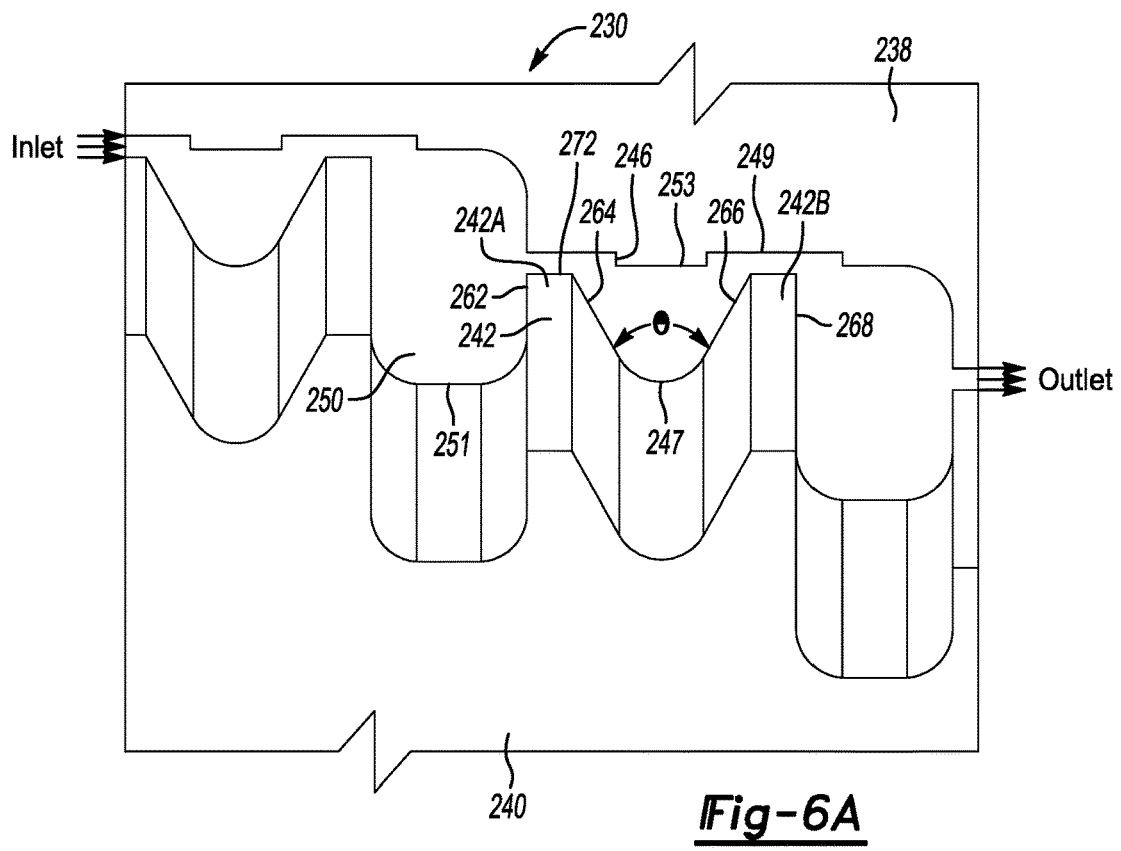
FIG. 6A shows another example step seal arrangement.

FIG. 6A illustrates another example step seal 230. To the extent not otherwise described or shown, the step seal 230 corresponds to the step seal 30 of FIGS. 3, 4A, and 4B, with like parts having reference numerals preappended with a "2." In this example, the step seal 230 reduces leakage flow by using a stepped arrangement and using abradable materials in the step seal. The performance of the seal 230 depends on the stepped design and the radial clearance at the tips of the teeth 242. In some known step seals, it can be difficult to control the amount of radial clearance, because thermal gradients, centrifugal and gas pressure forces, and shaft flexing, among other things may cause deflections between the components. The stator 238 includes an abradable portion 246 that is formed from an abradable material. In some examples, the abradable portion 246 is an insert arranged within a compressor housing. The abradable portion 246 helps to minimize clearance between the tips of the teeth 242 and the stator 238. The abradable portion 246 starts off at a very close clearance to the rotor 240 and teeth 242 and gradually wears away over time as the teeth 242 come into contact with the abradable portion 246.

As shown in FIG. 6A, the abradable portion 246 wears away as the compressor 10 runs over time. A track 249 is carved into the abradable portion 246 radially outward of each of the teeth 242. Each of the teeth 242 has a flat tip 272 that forms the track 249. As the rotor 240 rotates, the teeth 242 contact the abradable portion 246 and wear off some of the abradable portion 246 in the tracks 249 where the teeth 242 contacted the abradable portion 246. The tracks 249 provide a very small gap between the teeth 242 and the stator 238. In other words, once the tracks 249 are formed by the teeth 242, a portion 253 of the abradable material extends radially inward of the tracks 249 between tracks 249. The tracks 249 may be wider in the axial direction than the tips 272 of the teeth 242 due to axial movement of the impeller 16, 18.

In this arrangement, the upstream surface 262 of the first tooth 242A and the downstream surface 268 of the second tooth 242B are substantially perpendicular to the radially inner cavity wall 251. The surfaces 262, 268 meet the cavity wall 251 at a rounded edge to form a curved cavity 250. The downstream surface 264 of the first tooth 242A meets the upstream surface 266 of the second tooth 242B at a curved surface 247 to form a second curved cavity 248. The surfaces 264, 266 are arranged at an angle ⊖ to one another. The angle ⊖ may be less than 90° in one example. In a further example, the angle ⊖ is between 45° and 90°. The particular tooth arrangement may be selected based on the particular compressor size and speed, for example.

The abradable portion 246 is formed from an abradable material. Example abradable materials may include polytetrafluoroethylene ("PTFE"), polyamide, and other low strength alloys. The rotor 240 and teeth 242 are generally formed from a hard material that can wear away the abradable portion 246, such as an aluminum alloy, stainless steel, carbon steel, nickel alloy (such as Inconel), etc. The abradable portion 246 and the tracks 249 formed over time permit a minimal gap size, which makes it more difficult for the flow to continue, and thus improves the sealing capability of the seal 230.

The use of abradable materials may result in debris as the abradable portion is worn down. Although the abraded amount may be small, the system may include high precision parts. For example, bearings, sensors, and power electronics within the system cannot have intrusion of debris. In some examples, a debris trap may be arranged downstream of the teeth 242 to capture any debris from the abradable portion 246 as it is worn away. The debris trap may be arranged on a discharge path to redirect the debris away from any sensitive components downstream of the seal 230.

Figure 6B:
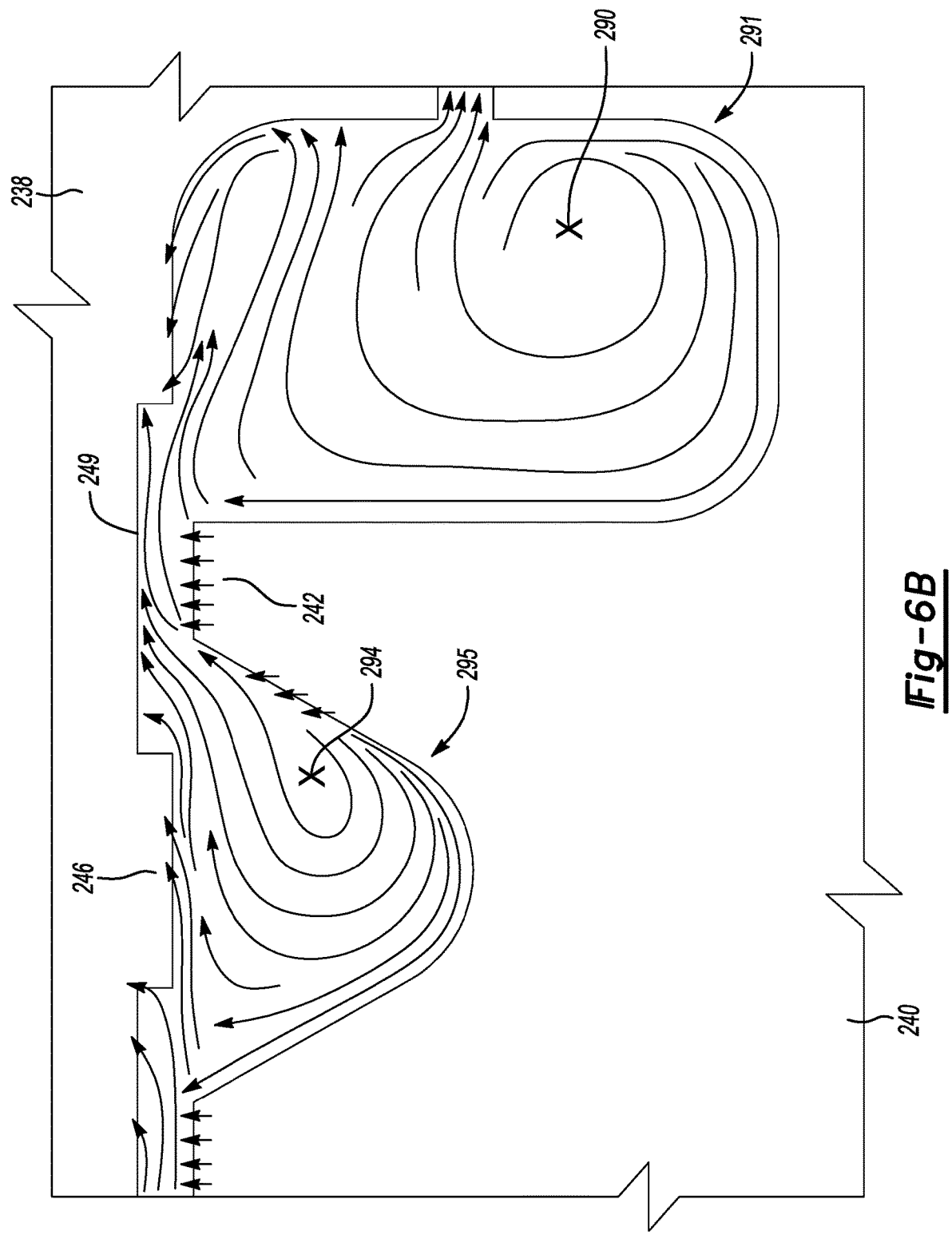
FIG. 6B shows the example step seal arrangement of FIG. 6A.

FIG. 6B illustrates the fluid flow through the step seal 230. The abradable material may provide a significantly smaller radial clearance than an arrangement with a hard material, which may further reduce leakage. The combination of two teeth 242A, 242B followed by a rounded rectangular cavity 250 provides a particular flow pattern having two vortices 290, 294 and two recirculation regions 291, 295. This recirculation arrangement may decrease total leakage flow. In some examples, this arrangement passively controls the flow to decrease total leakage, and may reduce leakage by 40-80% compared to known conventional seals.

Figure 7:
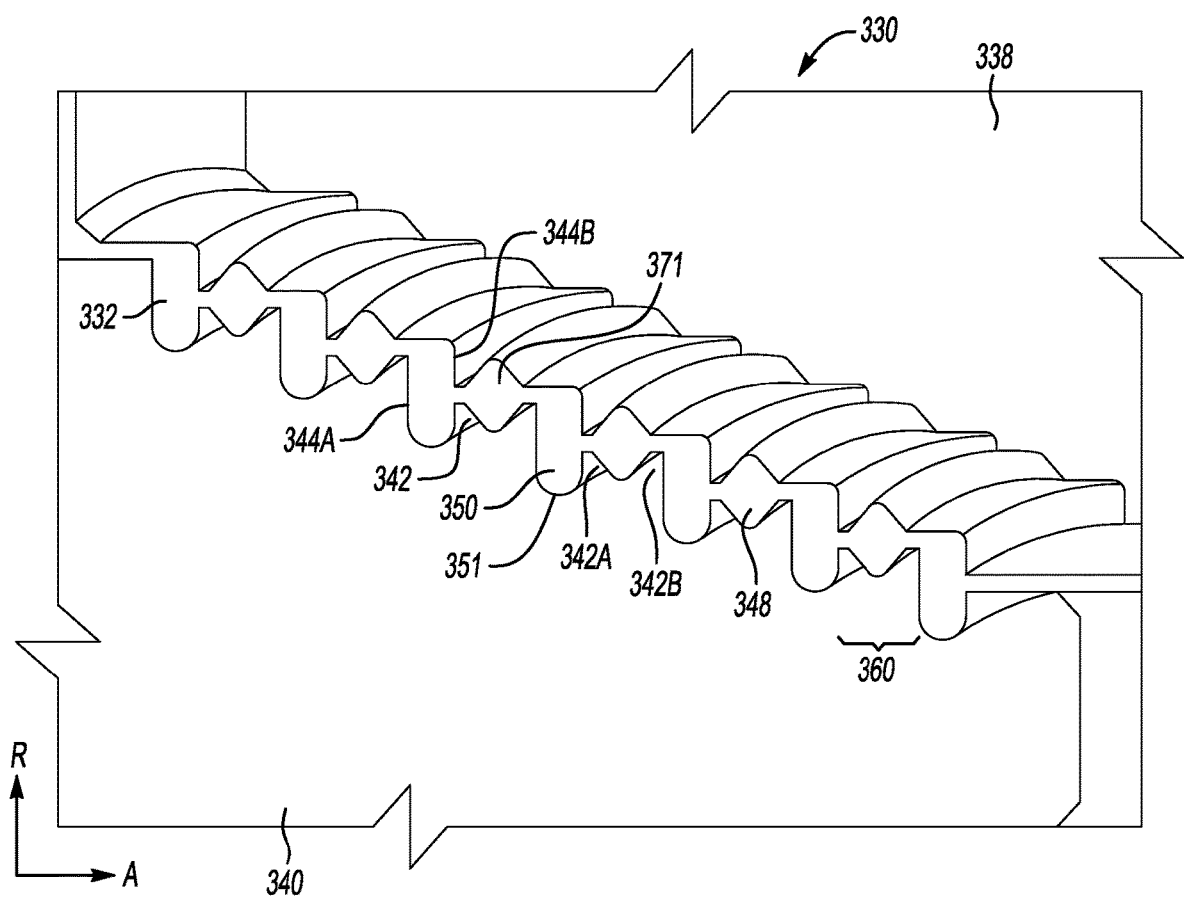
FIG. 7 shows a schematic view of another example step seal arrangement.

FIG. 7 illustrates another example step seal 330. To the extent not otherwise described or shown, the step seal 330 corresponds to the step seal 30 of FIGS. 3, 4A, and 4B, with like parts having reference numerals preappended with a "3." In this example, the teeth 342 on the rotor 340 are spaced-apart radially by steps 344A. In the illustrated example, the steps 344A are formed such that the teeth are arranged in pairs 360. Each pair 360 has a first tooth 342A and a second tooth 342B. The teeth 342A, 342B in each pair 360 are at the same position in a radial direction relative to an axis of rotation of the rotor 340 (i.e., the axis A). Cavities 350 are formed between each pair of teeth 360, and cavities 348 are formed between the teeth 342A, 342B within each pair 360.

The steps 344A, teeth 342, and cavities 350 are cut out of the rotor 40 using known manufacturing techniques. Similar steps 344B are also cut into the stator 338 to align with the rotor 340. In this example, cavities 371 are formed in the stator 338 between the steps 344B. In some examples, the cavity 371 forms a tooth 359 in the stator 338 that extends towards the rotor 340. The tooth 359 may be have a substantially similar size and shape as the tooth 342A. The teeth 342, 359 and the steps 344A, 344B introduce reverse flow, which stalls refrigerant flow (such as trapping flow in the cavities 348, 350, 371), and helps decrease total leakage.

Figure 8A:
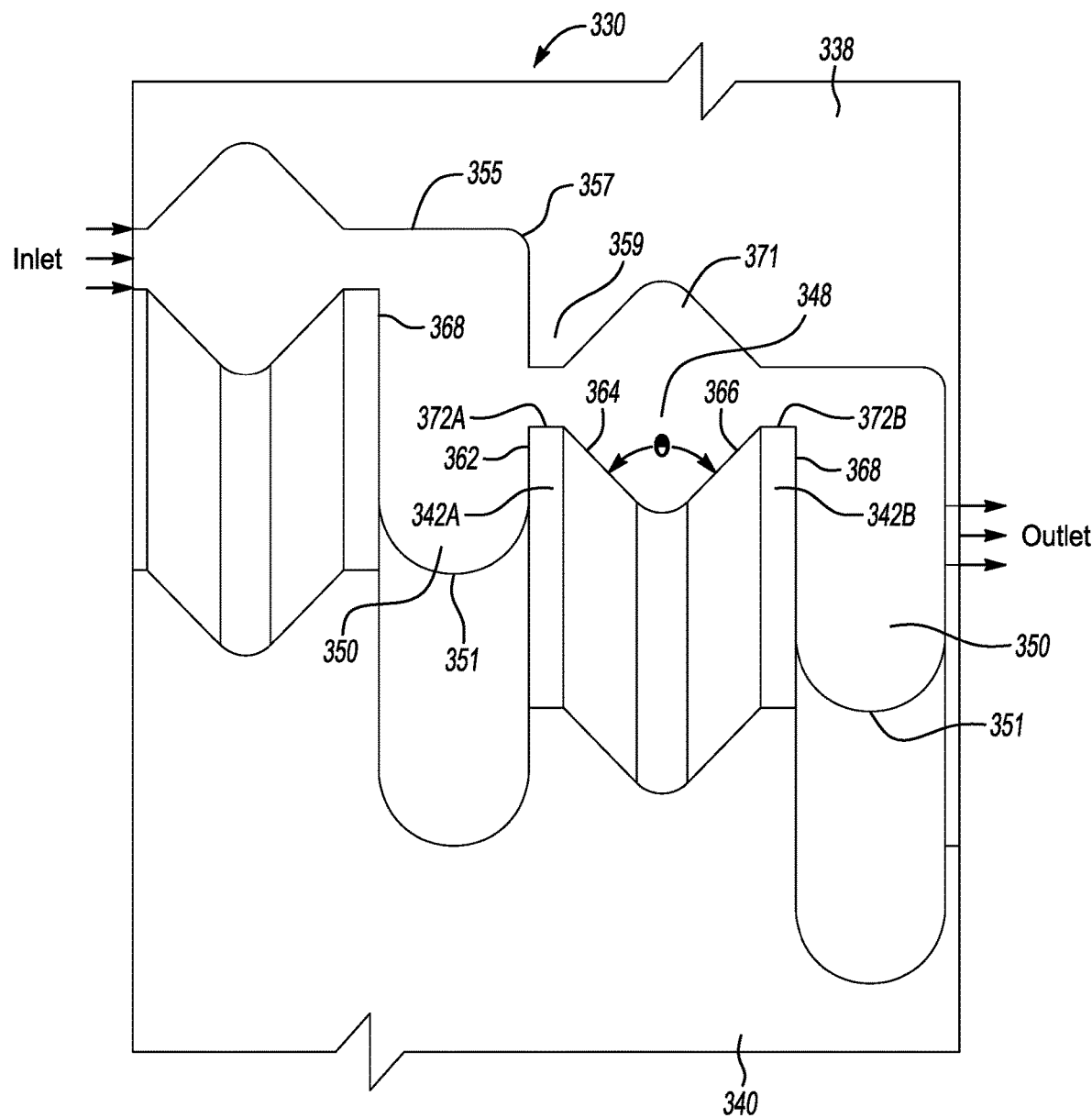
FIG. 8A shows an example step seal arrangement.

FIG. 8A illustrates the example step seal arrangement of FIG. 7. In this example, the two teeth 342A, 342B in each pair 360 form two cavities 348, 350. The cavity 350 is formed between an upstream surface 362 of the first tooth and a downstream surface 368 of the second tooth 342B. In this example, the cavity wall 351 is rounded at a radially innermost portion. The cavity wall 351 may have a semi-circle or radius, for example. A wall 355 opposite the rounded end of the cavity wall 351 may be substantially parallel to the axis A, for example. The cavity 350 has a rectangular shape with a rounded end, for example. The surfaces 362, 368 may extend substantially perpendicular relative to the axis A. The tooth 359 may meet the wall 355 at a fillet 357, in some examples.

The cavity 348 formed between the teeth 342A, 342B within a pair of teeth 360 has an angled shape. The downstream surface 364 of the first tooth 342A and the upstream surface 366 of the second tooth 342B are angled relative to the axis A. The downstream surface 364 of the first tooth 342A and the upstream surface 366 of the second tooth 342B are arranged at an angle ⊖ relative to one another. The angle ⊖ may be about 90°, for example. In other examples, the angle ⊖ may be less than 90°. A cavity 371 is formed in the stator 338 opposite the cavity 348. The cavity 371 may have a similar shape as the cavity 348 and be substantially aligned with the cavity 348. The cavity 371 is a reflection of the cavity 348 about a plane parallel to the axial direction and arranged radially between the cavities 348, 371, in one example.

The upstream surface 362 and downstream surface 364 of the first tooth 342A meet at an end surface 372A. The upstream surface 366 and the downstream surface 368 of the second tooth 342B meet at an end surface 372B. The end surfaces 372A, 372B within each pair 360 extend to a same position in the radial direction. The geometry of the flow path changes the speed and trajectory of fluid flow, which may decrease leaks through the seal.

Figure 8B:
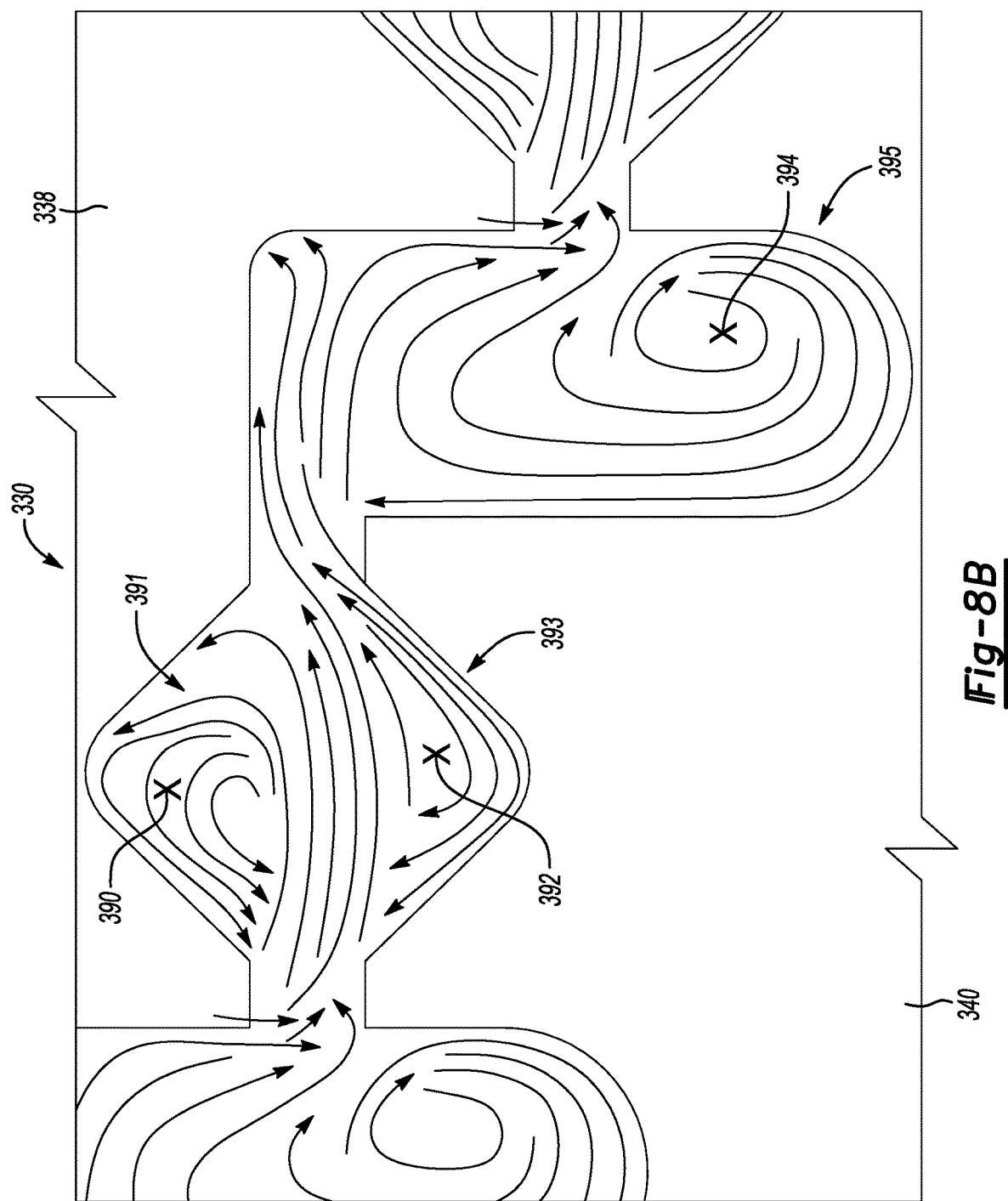
FIG. 8B shows the example step seal arrangement of FIG. 8A.

FIG. 8B illustrates the fluid flow through the step seal 330. As fluid flows from left to right in this example, the tooth and cavity arrangement provides three recirculation zones 391, 393, 395 per step. The arrangement of teeth 342 and cavities 348, 350, 371 create vortices 390, 392, 394 in the flow field. In some examples, this arrangement passively controls the flow to decrease total leakage.

Any of the above described step seals 30, 130, 230, 330 may be used in any of the seal locations 30A-30D. In some examples, different types of step seals 30, 130, 230, 330 may be used in different seal locations 30A-30D within the same compressor 10.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant compressor, comprising: a stator; a rotor configured to rotate with respect to the stator; and at least one step seal between the rotor and the stator, wherein the step seal comprises a first tooth and a second tooth extending from the rotor toward the stator, wherein a downstream surface of the first tooth and an upstream surface of the second tooth are arranged at an angle relative to one another, wherein the angle is less than 90°, wherein the stator has an abradable portion, wherein the first and second teeth extend toward the abradable portion, wherein the first and second teeth are configured to contact the abradable portion and carve tracks into the abradable portion over time, and wherein each of the tracks carved into the abradable portion exhibits an axial dimension greater than an axial dimension of a tip of a corresponding one of the first and second teeth.

2. The refrigerant compressor as recited in claim 1, wherein the first tooth and the second tooth comprise a pair of teeth, and the step seal comprises a plurality of pairs of teeth, and wherein each pair of teeth is provided in a stepped arrangement such that each pair of teeth is arranged at a different radial distance from an axis of rotation of the rotor relative to an adjacent pair of teeth.

3. The refrigerant compressor as recited in claim 1, wherein the first tooth has a first point and the second tooth has a second point, and wherein the first and second points are arranged at a common radial position.

4. The refrigerant compressor as recited in claim 1, wherein the downstream surface of the first tooth and the upstream surface of the second tooth meet at a curved surface to form a curved cavity.

5. The refrigerant compressor as recited in claim 4, wherein a radially inner cavity wall is arranged downstream of the second tooth to form a second cavity downstream of the curved cavity.

6. The refrigerant compressor as recited in claim 5, wherein the second cavity is a curved cavity.

7. The refrigerant compressor as recited in claim 1, wherein the refrigerant compressor is used in a heating, ventilation, and air conditioning (HVAC) chiller system.

8. The refrigerant compressor as recited in claim 1, wherein a stator cavity is arranged in the stator, the stator cavity is arranged axially between the first tooth and the second tooth.

9. A refrigeration system, comprising:
a condenser;
an evaporator;
an expansion device; and
a compressor, wherein the compressor includes a stator, a rotor configured to rotate with respect to the stator, and at least one step seal between the rotor and the stator, wherein the step seal comprises a first tooth and a second tooth extending from the rotor toward the stator, wherein a downstream surface of the first tooth and an upstream surface of the second tooth are arranged at an angle relative to one another, wherein the angle is less than 90°, wherein an upstream surface of the first tooth and a downstream surface of the second tooth are arranged substantially perpendicular to a radially innermost-portion of a wall of a cavity immediately adjacent one of the first and second teeth.

10. The refrigeration system as recited in claim 9, wherein the first tooth and the second tooth comprise a pair of teeth, and the step seal comprises a plurality of pairs of teeth, each pair of teeth provided in a stepped arrangement such that each pair of teeth is arranged at a different radial distance from an axis of rotation of the rotor relative to an adjacent pair of teeth.

11. The refrigeration system as recited in claim 9, wherein the first tooth has a first point and the second tooth has a second point, and wherein the first and second points are arranged at a common radial position.

12. The refrigeration system as recited in claim 9, wherein the downstream surface of the first tooth and the upstream surface of the second tooth meet at a curved surface to form a curved cavity.

13. The refrigeration system as recited in claim 12, wherein a radially inner cavity wall is arranged downstream of the second tooth to form a second cavity downstream of the curved cavity.

14. The refrigeration system as recited in claim 13, wherein the second cavity is a curved or square cavity.

15. The refrigeration system as recited in claim 9, wherein the stator has an abradable portion, wherein the first and second teeth extend toward the abradable portion, and wherein the first and second teeth are configured to contact the abradable portion and carve tracks into the abradable portion over time, and wherein each of the tracks carved into the abradable portion exhibits an axial dimension greater than an axial dimension of a tip of a corresponding one of the first and second teeth.

16. The refrigerant compressor as recited in claim 1, wherein an upstream surface of the first tooth and a downstream surface of the second tooth are arranged substantially perpendicular to a radially innermost-portion of a wall of a cavity immediately adjacent one of the first and second teeth.

17. The refrigeration system as recited in claim 9, wherein the upstream surface of the first tooth and the downstream surface of the second tooth are arranged substantially perpendicular to an axis of rotation of the rotor.

18. The refrigeration system as recited in claim 9, wherein the second tooth is the closest tooth of the rotor to the first tooth when moving from the first tooth in a downstream direction.

* * * * *